(12) United States Patent
Deiss et al.

(10) Patent No.: US 8,557,155 B2
(45) Date of Patent: Oct. 15, 2013

(54) PROCESS FOR PRODUCTION OF POLYETHYLENE TEREPHTHALATE PELLETS

(75) Inventors: Stefan Deiss, Harxheim (DE); Frank Gloeckner, Aschaffenburg (DE); Horst Mueller, Hausen (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 0 days.

(21) Appl. No.: 13/569,966

(22) Filed: Aug. 8, 2012

(65) Prior Publication Data

US 2012/0309928 A1     Dec. 6, 2012

Related U.S. Application Data

(63) Continuation of application No. PCT/EP2011/000566, filed on Feb. 7, 2011.

(51) Int. Cl.
*C08G 63/88*     (2006.01)
(52) U.S. Cl.
USPC .......................................................... 264/143
(58) Field of Classification Search
USPC ........................................ 264/143; 528/308.2
See application file for complete search history.

(56) References Cited

U.S. PATENT DOCUMENTS

| 7,192,545 B2 | 3/2007 | Ekart et al. | |
| 7,250,486 B1 * | 7/2007 | McGehee | 528/308 |
| 2005/0110182 A1 * | 5/2005 | Eloo | 264/69 |

FOREIGN PATENT DOCUMENTS

| DE | 20031049016 | 10/2005 |
| WO | 0181450 | 11/2001 |

* cited by examiner

*Primary Examiner* — Robert J Grun
(74) *Attorney, Agent, or Firm* — Buskop Law Group, PC; Wendy Buskop

(57) ABSTRACT

A process for production of polyethylene terephthalate pellets includes the steps of: production of a melt of polyethylene terephthalate material; production of polyethylene terephthalate pellets from the melt by means of underwater pelletization into a process fluid; removal of the polyethylene terephthalate pellets from the site of underwater pelletization in the process fluid; crystallization of the polyethylene terephthalate pellets in the process fluid, wherein a surface of the polyethylene terephthalate pellets is crystallized and an interior of the polyethylene terephthalate pellets remains amorphous.

12 Claims, No Drawings

PROCESS FOR PRODUCTION OF POLYETHYLENE TEREPHTHALATE PELLETS

CROSS REFERENCE TO RELATED APPLICATIONS

The present patent application claims priority as a Continuation Application to and the benefit of co-pending International Patent Application No. PCT/EP2011/000566 filed Feb. 7, 2011, entitled "Process for Production of Polyethylene Terephthalate Pellets," which claims priority to DE Application No. 10 2010 007 163.3, which was filed Feb. 8, 2010. These references are incorporated in their entirety herein.

FIELD

The present embodiments generally relate to a process for production of polyethylene terephthalate (PET) pellets.

BACKGROUND

A need exists for a process for the production of polyethylene terephthalate (PET) pellets, wherein the process is a simple and cost-effective process.

A further need exists for a process for the production of polyethylene terephthalate (PET) pellets that is reproducible.

An additional need exists for a process for the production of polyethylene terephthalate (PET) pellets that is done in a controllable manner, and reliably permits the production of easily further-processable polyethylene terephthalate (PET) pellets.

The present embodiments meet these needs.

BRIEF DESCRIPTION OF THE DRAWINGS

N/A

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a process for production of polyethylene terephthalate (PET) pellets.

The process for production of polyethylene terephthalate (PET) pellets can include the step of production of a melt of polyethylene terephthalate (PET) by means of polycondensation or from recycling material.

The process for production of polyethylene terephthalate (PET) pellets can also include the step of production of polyethylene terephthalate (PET) pellets using underwater pelletization. For example, an underwater pelletizer, such as the kind manufactured and marketed by Automatik Plastics Machinery GmbH under the product name SPHERO® can be used. The polyethylene terephthalate (PET) pellets can be pelletized in a process fluid.

The process for production of polyethylene terephthalate (PET) pellets can include the step of removal of the polyethylene terephthalate (PET) pellets from the site of underwater pelletization in the process fluid.

The process for production of polyethylene terephthalate (PET) pellets can include crystallization of the polyethylene terephthalate (PET) pellets in the process fluid. In the crystallization step, the surface of the polyethylene terephthalate (PET) pellets are crystallized, and the interior of the polyethylene terephthalate (PET) pellets remains amorphous. The temperature of the process fluid can be adjusted to a value so that a previously experimentally determined maximum crystallization rate of the polyethylene terephthalate material of the pellets is reached. The temperature and experimentally determined maximum crystallization can depend on the formulation of the polyethylene terephthalate material.

After the crystallization step, the opacity of the surface of the polyethylene terephthalate (PET) pellets can be determined as a measure of the achieved degree of crystallization and as a measure of the achieved crystallization depth at the surface of the polyethylene terephthalate (PET) pellets.

An additional after-cooling step can be provided for after-cooling of the polyethylene terephthalate (PET) pellets in an after-cooling fluid, such as water, at a temperature. The temperature can be about 400 degrees Celsius. After extraction of the polyethylene terephthalate (PET) pellets with the process fluid, the after-cooling can be performed. The process fluid itself can serve as the after-cooling fluid.

The process for production of polyethylene terephthalate (PET) pellets can include extraction of the polyethylene terephthalate (PET) pellets in the process fluid. An impeller extractor can be used for the extraction. Any excess pressure above ambient pressure of the process fluid with the therein contained polyethylene terephthalate (PET) pellets can be eliminated.

The process for production of polyethylene terephthalate (PET) pellets can also include separating the polyethylene terephthalate (PET) pellets from the process fluid.

Initially, at least, the interior of the produced polyethylene terephthalate (PET) pellets remains amorphous and the surface of the produced polyethylene terephthalate (PET) pellets is crystallized at the maximum crystallization rate. The opacity of the surface of the polyethylene terephthalate (PET) pellets can be subsequently determined online, i.e. directly as part of the process.

For example, opacity of the surface of the polyethylene terephthalate (PET) pellets can be subsequently determined online directly after crystallization, in the material flow of the process as a measure of the achieved degree of crystallization, i.e. the intensity of crystallization in the crystallized region, and as a measure of the achieved crystallization depth, i.e. the three-dimensional extent of crystallization at the surface of the polyethylene terephthalate (PET) pellets.

The opacity of the surface of the polyethylene terephthalate (PET) pellets can be determined while the polyethylene terephthalate (PET) pellets are still in the process fluid. The opacity of the surface of the polyethylene terephthalate (PET) pellets can also be determined after the polyethylene terephthalate (PET) pellets have been separated from the process fluid. The opacity of the surface of the polyethylene terephthalate (PET) pellets can be determined directly at the site of crystallization of the polyethylene terephthalate (PET) pellets. The polyethylene terephthalate (PET) pellets do not need to be dried.

The polyethylene terephthalate (PET) pellets do not need to be tested offline with regard to their crystallization. The process eliminates the need for additional, elaborate, laboratory-based measuring processes after opacity of the polyethylene terephthalate (PET) pellets have passed through the production process.

The process for production of polyethylene terephthalate (PET) pellets allows the simple and cost-effective production of polyethylene terephthalate (PET) pellets, wherein the process reliably produces in reproducible and controllable manner easily further-processable polyethylene terephthalate (PET) pellets from the polyethylene terephthalate (PET) material, wherein the polyethylene terephthalate (PET) pellets do not agglutinate in the time up to when they are used.

The opacity of the surface of the polyethylene terephthalate (PET) pellets can be determined in a quick and simple manner if the opacity of the surface of the polyethylene terephthalate (PET) pellets is determined optically by refraction. This involves light, such as laser light, being aimed at the polyethylene terephthalate (PET) pellets, wherein the measured deflection of the light or reduction in intensity of the light can be used to deduce the opacity of the surface of the polyethylene terephthalate (PET) pellets and thus the achieved crystallization at the surface of the polyethylene terephthalate (PET) pellets.

The temperature of the process fluid, the duration of the crystallization step, or both can be changed upon a change of the degree of opacity of the surface of the polyethylene terephthalate (PET) pellets from the determined opacity of the surface of the polyethylene terephthalate (PET) pellets. The opacity of the surface of the polyethylene terephthalate (PET) pellets can be determined in the step of determination of the opacity of the surface of the polyethylene terephthalate (PET) pellets.

The temperature of the process fluid in the crystallization step can be in the range of 180 degrees Celsius±10 degrees Celsius. For the hitherto investigated formulations of polyethylene terephthalate materials, the previously experimentally determined maximum crystallization rate of the polyethylene terephthalate material is in the temperature range.

In the crystallization step, the retention time of the polyethylene terephthalate (PET) pellets in the process fluid can be in the range of about 0.5 minutes to about 10 minutes. In one or more embodiments, the retention time can range from about 1 minute to about 5 minutes.

In order to achieve a sufficient surface crystallization of the produced polyethylene terephthalate (PET) pellets and in order, at the same time, to ensure that the interior of the polyethylene terephthalate (PET) pellets remains amorphous, the crystallization step can be executed so that the crystallization depth at the surface of the polyethylene terephthalate (PET) pellets can be up to about 10 percent of the radius of the polyethylene terephthalate (PET) pellets.

The process fluid can be at an increased pressure above ambient pressure for underwater pelletization, removal of the polyethylene terephthalate (PET) pellets and the crystallization step. The pressure of the process fluid can be equal to or greater than 1 bar. In one or more embodiments, the pressure of the process fluid can be equal to or greater than 3 bar. In another embodiment, the pressure of the process fluid can be equal to or greater than 4 bar. In yet another embodiment, the pressure of the process fluid can be equal to or greater than 10 bar. If water is used as the process fluid, the pressure can be equal to or greater than 10 bar, because, in the pressure range, the water as process fluid can have a temperature of 180 degrees Celsius±10 degrees Celsius without crossing over into the vaporous phase.

After the crystallization step, the polyethylene terephthalate (PET) pellets, up until the time they are used, can be maintained at a temperature below the temperature of the maximum crystallization rate. For example, in additional downstream processing steps the polyethylene terephthalate (PET) pellets can be subjected, for example, to post-condensation (SSP).

In further processing of the polyethylene terephthalate (PET) pellets produced by the process, for example, in the production of plastic bottles (for which the polyethylene terephthalate (PET) pellets produced by the process can be used) the polyethylene terephthalate (PET) pellets can be subjected to a process temperature above the herein adjusted temperature of the maximum crystallization rate in the crystallization step because melting of the polyethylene terephthalate (PET) pellets can be desired during subsequent use.

The process fluid can be any fluid. Illustrative process fluid can include water, ambient air, or nitrogen.

The process for production of polyethylene terephthalate (PET) pellets will now be explained in greater detail with reference to the example, wherein the below-described tests were performed by the applicant.

EXAMPLE

A polyethylene terephthalate (PET) material with an intrinsic viscosity of 0.75 dl/g was extruded into water as process fluid at a throughput rate of 35 kg per hour per nozzle hole through a die plate of a SPHERO® underwater pelletizer manufactured by Automatik Plastics Machinery GmbH and was, immediately upon exit from the nozzle holes, cut into pellets by a cutting knife apparatus. Having been thus pelletized into the water, the polyethylene terephthalate (PET) pellets were removed in the water from the site of underwater pelletization.

The temperature of the water was experimentally varied in three stages in the then ensuing crystallization step, the water pressure being so adjusted according to the respective water temperature that there was no evaporation of the water. After a uniform retention time according to the crystallization step of the process, the polyethylene terephthalate (PET) pellets were subsequently extracted from the zone of underwater pelletization via an impeller extractor and separated from the water and thereafter further cooled in an additional water bath at 40 degrees Celsius, and thereafter subjected to a drying step. Thereupon, samples of the polyethylene terephthalate (PET) pellets were taken to determine the degree of opacity according to the process. On the basis of additional microscopic examination of thin sections of the thus obtained polyethylene terephthalate (PET) pellets, a correlation was then established between the determined degree of opacity and the thickness of the crystalline surface layer of the respective polyethylene terephthalate (PET) pellets.

The thus executed sample examinations yielded the following results:

For all samples:

The average diameter of the produced polyethylene terephthalate (PET) pellets was 2.7 mm. The respective retention time of the polyethylene terephthalate (PET) pellets in the process fluid (water) in the crystallization step was 75 seconds.

TABLE 1

|  | Sample a | Sample b | Sample c |
| --- | --- | --- | --- |
| Process fluid (water) temperature | 160° C. | 170° C. | 180° C. |
| Opacity, determined by comparison with formazin standard according to DIN EN 27027 | 27 NTU | 29 NTU | 32 NTU |
| Thickness of the crystallized surface layer | 11 μm | 11 μm | 13 μm |
| Assessment of pellets with regard to surface characteristics | Surface acceptably scarcely sticky | Surface not sticky | Surface not sticky |

The thus produced polyethylene terephthalate (PET) pellets can be used, for example, for further processing in PET bottle production.

While these embodiments have been described with emphasis on the embodiments, it should be understood that within the scope of the appended claims, the embodiments might be practiced other than as specifically described herein.

What is claimed is:

1. A process for production of polyethylene terephthalate pellets comprising the steps of:
   a. production of a melt of polyethylene terephthalate material;
   b. production of polyethylene terephthalate pellets from the melt by means of underwater pelletization into a process fluid;
   c. removal of the polyethylene terephthalate pellets from a site of underwater pelletization in the process fluid;
   d. crystallization of the polyethylene terephthalate pellets in the process fluid, wherein during crystallization a surface of the polyethylene terephthalate pellets is crystallized and an interior of the polyethylene terephthalate pellets remains amorphous, wherein a temperature of the process fluid is adjusted, depending on a formulation of the polyethylene terephthalate material, to a value at which, a previously experimentally determined maximum crystallization rate of the polyethylene terephthalate material of the polyethylene terephthalate pellets is reached, and wherein, after the crystallization step, opacity of the surface of the polyethylene terephthalate pellets is determined as a measure of an achieved degree of crystallization and as a measure of an achieved crystallization depth at the surface of the polyethylene terephthalate pellets, and wherein the opacity of the surface is determined online directly as part of the process;
   e. extraction of the polyethylene terephthalate pellets in the process fluid; and
   f. separation of the polyethylene terephthalate pellets from the process fluid.

2. The process of claim 1, wherein the opacity of the surface of the polyethylene terephthalate pellets is determined optically by refraction.

3. The process of claim 2, further comprising changing the temperature of the process fluid, a duration of the crystallization step, or both during the crystallization step upon a change in the opacity of the surface of the polyethylene terephthalate pellets.

4. The process of claim 3, wherein in the crystallization step, the temperature of the process fluid is at 180 degrees Celsius±10 degrees Celsius.

5. The process of claim 1, further comprising changing the temperature of the process fluid, a duration of the crystallization step, or both during the crystallization step upon a change in the opacity of the surface of the polyethylene terephthalate pellets.

6. The process of claim 5, wherein in the crystallization step, the temperature of the process fluid is at 180 degrees Celsius±10 degrees Celsius.

7. The process of claim 1, wherein in the crystallization step, the temperature of the process fluid is at 180 degrees Celsius±10 degrees Celsius.

8. The process of claim 1, wherein in the crystallization step, the polyethylene terephthalate pellets are retained in the process fluid from 0.5 minutes to 10 minutes.

9. The process of claim 1, wherein the crystallization step is executed to provide the achieved crystallization depth at the surface of the polyethylene terephthalate pellets that is up to 10 percent of a radius of the polyethylene terephthalate pellets.

10. The process of claim 1, wherein for underwater pelletization, the removal of the polyethylene terephthalate pellets step and the crystallization step, the process fluid is at an increased pressure above ambient pressure, the increased pressure being at least 1 bar.

11. The process of claim 1, wherein after the crystallization step, the polyethylene terephthalate pellets are, up until they are used, maintained at a temperature below a temperature of the determined maximum crystallization rate.

12. The process of claim 1, wherein the process fluid is water, ambient air, or nitrogen.

* * * * *